United States Patent Office 3,758,510
Patented Sept. 11, 1973

3,758,510
PROCESS FOR PRODUCING FLUORINATED
CYCLIC KETALS
Serge Yvou Delavarenne, Wemmel, Belgium, assignor to
Union Carbide Corporation, New York, N.Y.
No Drawing. Filed July 30, 1970, Ser. No. 59,723
Int. Cl. C07d 13/04
U.S. Cl. 260—340.9          6 Claims

ABSTRACT OF THE DISCLOSURE

Fluorinated cyclic ketals are produced by cyclizing a fluorinated hemiketal chloroformate with a base. For instance, 2,2-bis(trifluoromethyl)-1,3-dioxolane is produced by cyclizing the monochloroformate ester of 1,1-bis(trifluoromethyl)-1-(2-hydroxyethoxy)methanol by using a base such as triethylamine as the cyclizing agent.

---

The invention relates to a process for the production of fluorinated cyclic ketals.

Fluorinated cyclic ketals constitute a known class of compounds whose synthesis by several different methods has been reported. For instance, Simmons et al.[1] have reported the preparation of fluorinated cyclic ketals from fluorinated ketones and halohydrins in the presence of potassium carbonate in accordance with the reaction sequence:

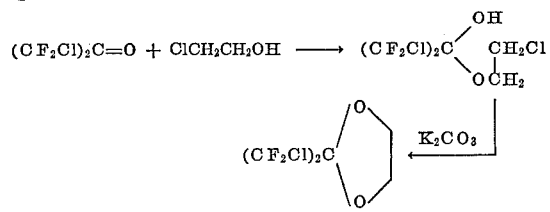

The present invention provides a broadly useful process for the production of fluorinated cyclic ketals utilizing as the reactants hemiketal derivatives of fluorinated ketones and polyols. The process of the invention contemplates the cyclization of a chloroformate ester of certain hemiketals with a base. The hemiketal chloroformate esters that are employed in the cyclization process of the invention can be represented by the following Formula I:

I)
$$\text{HO}-\underset{\underset{R^2}{|}}{\overset{\overset{R^1}{|}}{C}}-OR^3-O-\overset{\overset{O}{\|}}{C}-Cl$$

wherein $R^1$ and $R^2$ individually represent halogenated alkyl groups, the alpha carbon atoms of which are free of hydrogen and have at least one fluoro group, the remainder of the halo groups on said alpha carbon atoms being fluoro or chloro. The said halogenated alkyl groups each can have from 1 to, for example, 10 carbon atoms, preferably from 1 to 4 carbon atoms, and more preferably 1 carbon atom. The $R^1$ and $R^2$ variables can also be joined to form, together with the carbon atom to which they are bonded, a cycloaliphatic ring, preferably having five to seven atoms in the ring. The $R^3$ variable represents an alkylene group of from 2 to 4 carbon atoms, an alkenylene group of 4 carbon atoms, substituted derivatives thereof. The substituents that can be present on the alkylene or alkenylene group include alkyl, hydroxyl, cycloalkyl, aryl, alkenyl, alkynyl, ether oxygen, ester groups, haloalkyl, and the like.

The above-indicated hemiketal is cyclized in the process of the invention by utilizing a base. Many types of bases can be employed for this reaction. For instance, tertiary

[1] J. Am. Chem. Soc. 82, 2288 (1960) and U.S. Pat. No. 2,925,424.

amines, alkali metal carbonates, alkali metal hydrides, and the like can be employed.

Among the bases that can be employed in the cyclization reaction are aliphatic and aromatic tertiary amines such as triethylamine, triisopropylamine, tributylamine, N, N-dimethylcyclohexylamine, N,N - dimethylbenzylamine, N,N-dimethylaniline, and the like. Additional useful bases include alkali metal carbonates and hydrides such as potassium carbonate, sodium hydride, and the like.

The hemiketal reactant of Formula I is prepared by methods that are known in the art from known starting materials. A fluorinated ketone is reacted with a compound having at least two hydroxy groups to form a hemiketal, followed by reaction of the hemiketal with phosgene to form the monochloroformate ester thereof. The fluorinated ketones that can be employed to produce the hemiketal are known compounds, which can be represented by the following Formula II:

(II)
$$\underset{R^2}{\overset{R^1}{\diagdown}}C=O$$

wherein $R^1$ and $R^2$ are as defined above with respect to Formula I.

The compound having at least two hydroxyl groups that is used to react with the fluorinated ketone to produce the hemiacetal can be represented by the following Formula III:

(III)          $HO-R^3-OH$ wherein $R^3$ is as indicated above with respect to Formula I.

Specific illustrative fluorinated ketones that can be employed include hexafluoroacetone, sym.-tetrafluorodichloroacetone, sym.-difluorotetrachloroacetone, octafluorobutanone-2, octafluorocyclopentanone, decafluoropentanone-2, decafluorocyclohexanone, dodecafluorohexanone-3, tetradecafluoroheptanone-4, and the like.

Specific illustrative examples of the compounds having at least two hydroxyl groups which can be employed to produce the hemiketal include ethylene glycol, 1,2- and 1,3-propylene glycol, 1,2-, 1,3- and 1,4-butylene glycol, isobutylene glycol, 1,4-pentanediol, glycerol, 1,4-dihydroxy-2-butene, monoalkyl ethers of glycerol, 1-chloro-2,3-dihydroxypropane, alkyl esters of 2,3-dihydroxypropanoic acid, aryl esters of tartaric acid, and the like. A wide variety of such compounds can be used. The principal restriction on the compound having at least two hydroxyl groups is that it be free of substituents that would interfere with the desired reactions. Such undesired substituents include primary and secondary amino, amido and thiol. Preferably, the compound is one that will ultimately form a 5-membered ring.

The fluorinated ketone and hydroxy reactant are reacted in accordance with known procedures to form a hemiacetal. As is known in the art, this reaction is carried out by condensing substantially stoichiometric proportions of the fluorinated ketone with the hydroxy reactant at a temperature below the decomposition temperature of the hemiketal product. The reaction can be carried out either with or without the use of a reaction diluent. Where a diluent is employed, an aprotic solvent is particularly useful. Examples of such solvents include ethers such as dioxane, tetrahydrofurane, dimethoxy ethane, dimethoxypropane, diethyl ether, diisopropyl ether, dibutyl ether, and the like, aliphatic and aromatic hydrocarbons such as hexane, cyclohexane, petroleum ether, benzene, toluene, and the like.

After the production of the hemiketal, it can be reacted without further purification with a stoichiometric amount of phosgene at temperatures below about 50° C., for instance, at temperatures of from 0° C. to 25° C.

After the production of the chloroformate ester, it is desired to remove the HCl that is produced as a by-product in the preparation of the chloroformate ester in accordance with the following reaction:

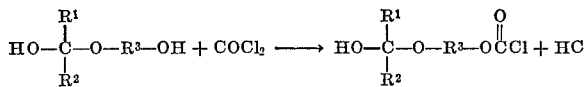

The HCl can be removed from the reaction mixture by standard procedures, such as by bubbling nitrogen or other inert gas through the reaction mixture.

After removal of the HCl, the hemiketal chloroformate ester is then cyclized to produce a cyclic ketal. The cyclization reactant is a base, as was indicated above. The reaction is preferably carried out by employing an excess of base, that is, more than 1 mole of base per mole of the hemiketal chloroformate ester reactant. The reaction is carried out at a temperature and for a period of time sufficient to cyclize the hemiketal chloroformate ester reactant. Normally, the reaction is complete after a reaction period of from about 0.5 to about 2.5 hours, and preferably from about 1 to about 2 hours. A reaction temperature within the range of from about −10° C. to about 50° C., and preferably from about 0° C. to about 25° C. is normally employed.

The cyclic ketal product can be recovered from the reaction mixture by standard procedures. For instance, the hydrochloride salt of the base that was employed will normally precipitate from solution, and it can be removed therefrom by filtration. The solvent, if any, and unreacted starting materials can then be separated from the product by fractional distillation.

The process of the invention is useful for the preparation of dioxolanes, dioxanes, and dioxepanes. Specific illustrative compounds that can be produced by the process of the invention include:

2,2-bis(trifluoromethyl)-1,3-dioxolane;
2,2-bis(trifluoromethyl)-4-methylol-1,3-dioxolane;
2,2-bis(trifluoromethyl)-4-methyl-1,3-dioxolane;
2,2-bis(trifluoromethyl)-4-vinyl-1,3-dioxolane;
2,2-bis(fluorodichloromethyl)-1,3-dioxolane;
2,2-bis(difluorochloromethyl)-1,3-dioxolane;
2-perfluoromethyl-2-perfluorobutyl-1,3-dioxolane;
2,2-bis(trifluoromethyl)-4-(1-hydroxyethyl)-1,3-dioxolane;
2,2-bis(trifluoromethyl)-4-(1,2-dihydroxyethyl)-1,3-dioxolane;
2,2-bis(trifluoromethyl)-4-ethoxycarbonyl-1,3-dioxolane;
2,2-bis(trifluoromethyl)-4-ethoxymethyl-1,3-dioxolane;
2,2-bis(trifluoromethyl)-4-chloromethyl-1,3-dioxolane;
2,2-bis(trifluoromethyl)-4-dichloromethyl-1,3-dioxolane;
2,2-bis(trifluoromethyl)-4-bromomethyl-1,3-dioxolane;
6,7,8,9-perfluoro-1,4-dioxaspiro[4.4]nonane;
6,7,8,9,10-perfluoro-1,4-dioxaspiro[4.5]decane;

and other dioxolanes.

Useful dioxanes and dioxepanes which can be produced by the process of the invention include:

2,2-bis(trifluoromethyl)-1,3-dioxane;
2,2-bis(trifluoromethyl)-1,3-dioxepane;
4-methyl-2,2-bis(trifluoromethyl)-1,3-dioxane;
5-methyl-2,2-bis(trifluoromethyl)-1,3-dioxane;
4-methyl-2,2-bis(trifluoromethyl)-1,3-dioxepane;
4,6-dimethyl-2,2-bis(trifluoromethyl)-1,3-dioxane;

and the like.

The cyclic ketals that are produced by the process of the invention constitute a known class of compounds having known utility. They can be used as solvents for coating resins and other organic materials. Additional utility for the cyclic ketals is disclosed in U.S. Pat. Nos. 2,901,514; 2,925,424; 3,314,850; 3,324,144; 3,324,145; 3,488,335 and 3,285,936.

The ketals that are produced by the process of the invention can be represented by the following Formula IV:

(IV) 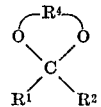

wherein $R^1$ and $R^2$ are as identified above with respect to Formula I, and wherein $R^4$ represents a substituted or unsubstituted alkylene group of from 2 to 4 carbon atoms, the permissible substituents on $R^4$ being as indicated above.

The following non-limiting examples illustrate the practice of the process of the invention:

EXAMPLE 1

In a well stirred solution of 0.12 mole (7.45 gm.) of ethylene glycol in 40 ml. of dimethoxyethane (diethyl ether can be used with no change in yield), there was condensed at 0° C. in about one hour 0.12 mole (20 gm.) of hexafluoroacetone. After the addition was complete, the reaction mixture was allowed to warm to room temperature, and it was stirred for one hour. The reaction mixture was then cooled to 0° C., and 0.12 mole (11.9 gm.) of phosgene was then allowed to condense in the flask. After stirring for one hour at 25° C., the excess HCl was removed by bubbling nitrogen under the liquid level. To the resulting chloroformate was then added 100 ml. of diethyl ether and, dropwise, 0.24 mole (24.3 gm.) of triethylamine. Triethylammonium chloride precipitates immediately, whereas at the same time, one observes an intense evolution of $CO_2$. After filtration of the triethylammonium chloride, the solvent was removed leaving a colorless, slightly viscous, water insoluble liquid which was fractionated to give 15.2 g. of pure 2,2-bis(trifluoromethyl)-1,3-dioxolane (yield: 60%). B.P.$_{760}$: 103°–105° C.; $n_{20}{}^D$: 1.311

EXAMPLE 2

By a procedure analogous to that described in Example 1, but replacing dimethoxyethane by THF (tetrahydrofuran), one obtains 5.4 g. (yield: 20%) of 2,2-bis(trifluoromethyl)-1,3-dioxane from 0.12 mole (9.12 g.) of 1,3-propanediol, 0.12 mole (20 g.) of hexafluoroacetone, and 0.12 mole (11.9 gm.) of phosgene. B.P.$_{760}$: 134° C.; $n_{20}{}^D$: 1.3334.

EXAMPLE 3

By a procedure similar to that in Example 2, one obtains 26 grams (yield: 90 percent) of 2,2-bis(trifluoromethyl)-4-methylol-1,3-dioxolane from 0.12 mole (11.05 g.) of glycerol and 0.12 mole (20 g.) of hexafluoroacetone. B.P.$_{15}$: 72° C.; $n_{20}{}^D$: 1.3536.

EXAMPLE 4

By a procedure similar to that in Example 2, one obtains 8.1 g. (yield: 30%) of 2,2-bis(trifluoromethyl)-4-methyl-1,3-dioxolane from 0.12 mole (9.12 g.) of 1,2-propanediol and 0.12 mole (20 g.) of hexafluoroacetone. B.P.$_{760}$: 103°–105° C.; $n_{20}{}^D$: 1.3183.

EXAMPLE 5

By a procedure similar to that in Example 2, one obtains 8.5 g. (yield: 30%) of 2,2-bis(trifluoromethyl)-4-vinyl-1,3-dioxolane from 0.12 mole (10.56 g.) of 2-butene-1,4 diol and 0.12 mole (20 g.) of hexafluoroacetone. B.P.$_{760}$: 103°–105° C.; $n_{20}{}^D$: 1.3183.

EXAMPLE 6

In a well stirred solution of 0.12 mole (11.05 g.) of glycerol in 40 ml. of THF, there was condensed at 0° C. in about one hour 0.12 mole (20 g.) of hexafluoroacetone. After the addition was completed, the reaction mixture was allowed to warm to room temperature and was stirred for one hour. The reaction mixture was then cooled to 0° C. and 0.12 mole (11.9 g.) of phosgene was then allowed to condense in the flask. After stirring for one hour at 25° C., the excess HCl was removed by bubbling nitrogen under the liquid level for two hours. To the resulting chloroformate was then added 60 ml. of THF followed by 0.2 mole (27.6 g.) of solid potassium carbonate which was added in three portions after periods of time of about 15 minutes. The reaction is slightly exothermic and one observes an intense evolution of $CO_2$. When the addition of potassium carbonate was completed, the reaction mixture was heated to the boiling point of the solvent for one hour. After cooling, the solid was separated by filtration and the solvent removed by distillation. Fractionation of the liquid residue offered 7.3 g. of 2,2-bis(trifluoromethyl)-4-methylol-1,3-dioxolane (yield: 25%). B.P.$_{15}$: 72° C.; $n_{20}{}^D$: 1.3536.

What is claimed is:

1. Process for producing cyclic ketals of the formula:

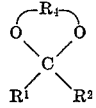

which comprises contacting a base selected from the group consisting of tertiary amines and alkali metal carbonates with a compound of the formula:

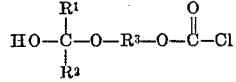

wherein $R^1$ and $R^2$ individually represent chloroalkyl, or fluoroalkyl of from 1 to 4 carbon atoms and contain at least one fluoro group, and wherein $R^3$ and $R^4$ represent an alkylene group of from 2 to 4 carbon atoms; in a reaction mixture for a period of time and at a temperature of from about −10° C. to about 150° C. to produce said cyclic ketals.

2. Process of claim 1 wherein the bae is contacted with said compound at a temperature within the range of from about 0° C. to about 25° C.

3. Process of claim 1 wherein the cyclic ketal is a dioxolane.

4. Process of claim 1 wherein the $R^1$ and $R^2$ variables are perfluorinated.

5. Process of claim 1 wherein the reaction mixture contains an inert organic diluent.

6. Process of claim 5 wherein the diluent is diethyl ether or dimethoxyethane.

References Cited
UNITED STATES PATENTS 3,532,715  10/1970  Hostettler et al. __ 260—340.7 X
2,476,637   7/1949  Strain et al. _____ 260—340.7
3,480,649  11/1969  Tomalia _____ 260—340.9

ALEX MAZEL, Primary Examiner

J. H. TURNIPSEED, Assistant Examiner

U.S. Cl. X.R.

260—338, 340.7